Sept. 2, 1941.    Y. SEKELLA    2,255,015
ENGINE STARTER GEARING
Filed Feb. 6, 1940    2 Sheets-Sheet 1

Witness:
Burr W. Jones

INVENTOR.
BY Youston Sekella
Clinton S. Janes
ATTORNEY.

Patented Sept. 2, 1941

2,255,015

UNITED STATES PATENT OFFICE 2,255,015

ENGINE STARTER GEARING

Youston Sekella, Elmira Heights, N. Y., assignor to Bendix Aviation Corporation, South Bend, Ind., a corporation of Delaware Application February 6, 1940, Serial No. 317,566

6 Claims. (Cl. 74—7)

The present invention relates to engine starter gearing and more particularly to a starter drive of the type in which the driving connection is established by the initial rotation of the motor shaft and is released by the overrunning of the engine when it becomes self-operative.

It is an object of the present invention to provide a novel starter gear drive which is efficient and reliable in operation while being simple and economical in construction.

It is another object to provide such a device incorporating provisions for enforcing mesh of the gearing without damage to the teeth.

It is a further object to provide such a device having cushioning means for the drive separate and distinct from the mesh-enforcing means.

Further objects and advantages will be apparent from the following description taken in connection with the accompanying drawings in which.

Figure 1:
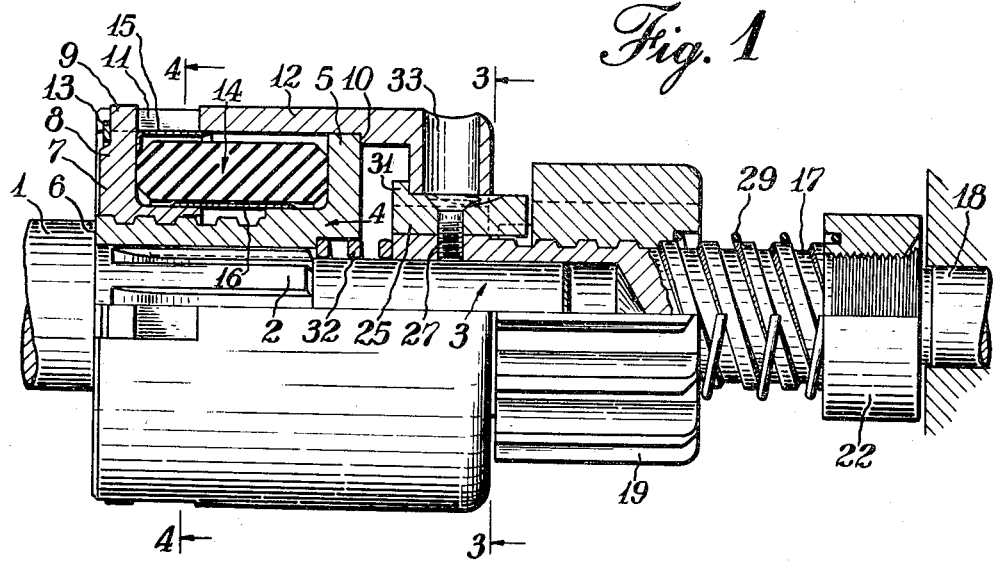
Fig. 1 is a side elevation partly in longitudinal section illustrating a preferred embodiment of the invention.

In the drawings there is illustrated a power shaft 1 having a reduced splined portion 2 and a further reduced plain portion 3. A screw shaft 4 having a circular flange 5 at one end is mounted on the splined portion 2 of the power shaft seated against a shoulder 6 at the end of said portion. A nut member 7 is threaded on the screw shaft 4 and is provided with a circular flange 8, the periphery of which is provided with radial lugs 9. A barrel 12 is arranged to enclose the screw shaft and nut, the flange 5 of the screw shaft normally seating against a shoulder 10 in the barrel, and the lugs 9 of the nut being slidably received in slots 11 in the barrel. The nut is retained in said barrel by suitable means such as a lock ring 13.

A cylindrical member 14 of elastically deformable material such as rubber is mounted on the screw shaft and nut between the flanges 5 and 8 thereof within the barrel 12 so as to be compressed by said flanges when the nut is threaded along the shaft. Thimbles 15 and 16 are preferably provided to prevent attrition of the elastic cylinder.

A second screw shaft 17 is slidably journalled on the plain portion 3 of the power shaft and is preferably provided with an end bearing 18 in the frame of the motor, not illustrated. A pinion 19 is threaded on the screw shaft 17 for movement into and out of engagement with a member such as a flywheel gear 21 of an engine to be started. A stop nut 22 for the pinion is fixed in any suitable manner on the end of the screw shaft 17 adjacent the engine member. The opposite end of the screw shaft 17 is provided with an enlarged head 23 having splines formed thereon which are adapted to engage slidably in a conforming opening 24 in the free end of the barrel 12. A backstop for the pinion in its idle position is provided in the form of a block 25 fixed in a longitudinal recess 26 in the head 23 of the screw shaft as by means of a screw 27. The pinion 19 is preferably provided with a shoulder 28 adapted to engage the backstop 25 when in idle position, and an anti-drift spring 29 is arranged to yieldingly maintain the pinion in such position.

Backstop 25 is provided with a radial flange 31 arranged to overlap interiorly the edge of the opening 24 in the barrel so as to retain the head 23 of the screw shaft 17 in said opening. A compression spring 32 is mounted on the plain portion 3 of the power shaft between the ends of the screw shafts 4 and 17 to normally maintain the screw shaft 17 in extended position, as illustrated in Fig. 1. In order to facilitate assembly of the parts, the end of the barrel 12 is provided with an opening 33 permitting access to the screw 27 for the backstop 25.

In the operation of this device, rotation of the power shaft 1 is transmitted to the screw shaft 4. Since longitudinal movement of the nut 8 is resisted by the elastic member 14, this rotation is transmitted through the nut and barrel to the screw shaft 17 whereby the pinion 19 is caused to move longitudinally into engagement with the engine member 21. The engine member is thereupon rotated from the power shaft, the application of torque being cushioned by the elasticity of the compressive element 14.

When the engine starts, the acceleration of the engine member throws the pinion 19 back to idle position against the backstop 25 where it is retained by the anti-drift spring 29.

Figure 2:
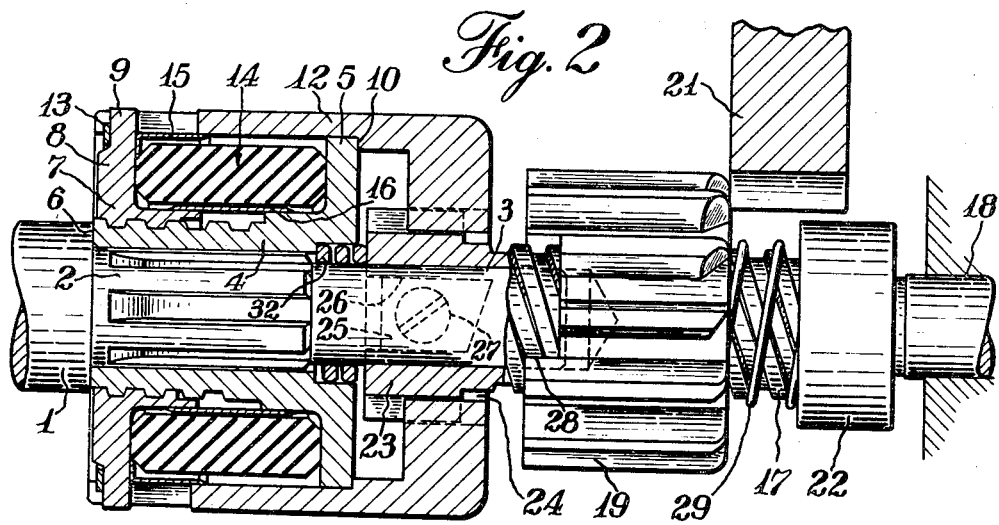
Fig. 2 is a similar view showing the parts in the positions assumed in case of tooth abutment of the pinion and the engine gear.
Figure 3:
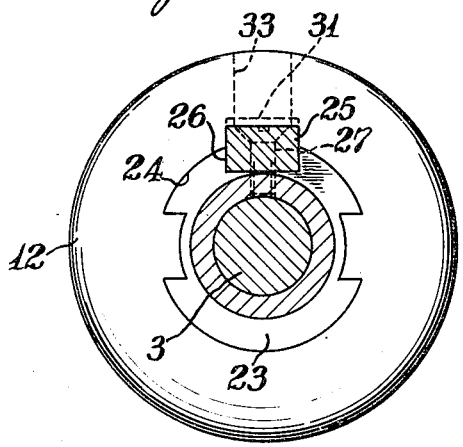
Fig. 3 is a section taken substantially on the line 3—3 of Fig. 1.
Figure 4:
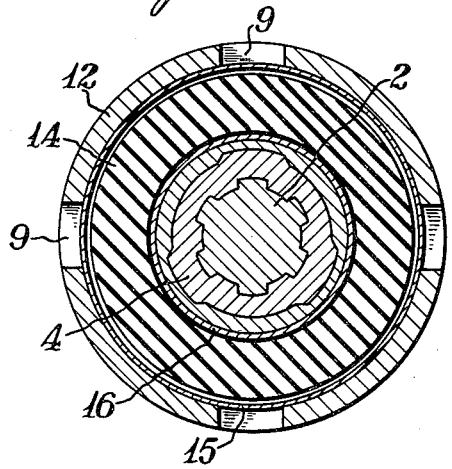
Fig. 4 is a section taken substantially on the line 4—4 of Fig. 1.

If, during the meshing movement of the pinion, tooth abutment of the engine member should occur, the screw shaft 17 moves backwardly as shown in Fig. 2, compressing the mesh-enforcing spring 32 until sufficient friction is built up between the threads of the pinion and screw shaft 17 to index the pinion into proper registry. The expansion of the spring 32 thereupon moves the pinion into initial mesh, whereupon meshing and cranking of the engine member take place as above set forth.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In engine starter gearing, a power shaft, a screw shaft fixed thereon having a terminal flange, a flanged nut threaded on the screw shaft, a cylinder of elastically deformable material surrounding the nut between said flanges, a barrel member surrounding the cylinder slidably journalled on the screw shaft flange and splined to the nut, a second screw shaft journaled on the power shaft splined in the barrel, and a pinion threaded on the last-mentioned screw shaft for longitudinal movement into and out of engagement with a member of an engine to be started.

2. Engine starter gearing as set forth in claim 1, in which an abutment is provided on the second screw shaft defining the idle position of the pinion, said abutment having means engaging the barrel for limiting longitudinal movement of the screw shaft in the barrel.

3. Engine starter gearing as defined in claim 1, in which a backstop for the pinion is fixed to the second screw shaft and has a flange adapted to engage the barrel to limit longitudinal movement of the screw shaft in the barrel, and in which a compression spring is located between the two screw shafts.

4. In an engine starter drive, a power shaft, a screw shaft fixed thereto having a radial flange at one end, a flanged nut threaded on the screw shaft, a cylinder of elastically deformable material surrounding the screw shaft between said flanges, a barrel splined to the nut and enclosing the elastic cylinder, a second screw shaft splined to the barrel slidably journalled on the power shaft, a pinion threaded on the second screw shaft, and yielding means opposing telescoping movement of the second screw shaft into the barrel.

5. In an engine starter drive, a power shaft, a screw shaft fixed thereon having a radial flange, a barrel member slidably mounted on the flange and having an abutment shoulder normally engaging the flange, a nut threaded on the screw shaft and having a flange splined in the barrel, a ring of elastically deformable material between the flanges, a screw shaft splined in the barrel, and a pinion having a threaded connection with the screw shaft for movement into and out of engagement with a member of an engine to be started.

6. In an engine starter drive, a power shaft having a splined portion of reduced diameter forming a shoulder, a flanged screw shaft splined on said reduced portion and seated against the shoulder, a flanged nut threaded on the screw shaft, a barrel member slidably mounted on the flange of the screw shaft and splined to the flange of the nut, a body of elastically deformable material in the barrel between said flanges, a second screw shaft slidably journalled on the power shaft and having a splined connection with the barrel, a pinion having a threaded connection with the second screw shaft, and a compression spring on the power shaft between the ends of the screw shafts.

YOUSTON SEKELLA.